United States Patent

Wood

[15] 3,685,477
[45] Aug. 22, 1972

[54] BOAT HULL PROTECTING APPARATUS

[72] Inventor: James J. Wood, Suite 703 Security Bldg., 110 Pine Ave., Long Beach, Calif. 90802

[22] Filed: Sept. 11, 1970

[21] Appl. No.: 71,566

[52] U.S. Cl. ............................................. 114/222
[51] Int. Cl. ............................................. B63b 59/02
[58] Field of Search ........... 114/222, 45; 60/399, 402

[56] References Cited

UNITED STATES PATENTS

| | | | |
|---|---|---|---|
| 3,205,851 | 9/1965 | Wiswell, Jr. | 114/222 |
| 411,775 | 10/1889 | Beach | 160/402 |
| 1,973,813 | 9/1934 | Kelley | 114/222 |
| 3,406,649 | 10/1966 | Burkhart | 114/45 |

*Primary Examiner*—Milton Buchler
*Assistant Examiner*—Gregory W. O'Connor
*Attorney*—Fulwider, Patton, Rieber, Lee & Utecht

[57] ABSTRACT

Apparatus for protecting a boat hull from marine growth while the boat is moored in seawater. The apparatus includes a rigid framework having a rear gate. The framework is covered with a bag formed of a flexible sheet of waterproof material that defines a space which encompasses the boat. An anti-fouling chemical is placed in this space to prevent marine growth on the boat hull. The gate and its attached portion of the bag is lowered to provide ingress and egress for the boat to be protected. The flexible bag is attached to the frame by unique means permitting ready replacement of the sheet without the use of special tools, adhesives or mechanical fasteners.

3 Claims, 4 Drawing Figures

PATENTED AUG 22 1972  3,685,477

INVENTOR.
JAMES J. WOOD
BY Fulwider, Patton, Rieber,
Lee and Utecht
ATTORNEYS

BOAT HULL PROTECTING APPARATUS

BACKGROUND OF THE INVENTION

1. Field of the Invention

The present invention relates to the art of boating, and more particularly to an improved apparatus for protecting the hull of a boat against marine growth.

2. Description of the Prior Art

Marine growth on the hulls of boats account for very high percentage of inefficiency in the movement of the boat through water. The usual practice is to periodically place the boat in dry-dock and to scrub the hull bottom to free it from accumulated marine growth. However, it has been heretofore proposed to provide a waterproof bag, which is either provided with boyant means at its upper portion or is attached to a dock and which defines a space surrounding the boat hull. This space is sealed against the entry of ambient seawater and receives a non-fouling chemical, such as chlorine tablets or the like. The rear portion of the bag is formed with a drawstring type closure that permits ingress and egress for the boat to be protected.

Although such prior art devices have generally prevented marine growth on boat hulls they have embodied certain serious disadvantages. For example, the bag should be turned inside out about every three months in order that the marine growth originally on the outer surface of the bag will be disposed on the inside surface of the bag whereby the growth then can be killed by the anti-fouling chemical. If such turnning procedure is not followed, the marine growth will be become so heavy that it will submerge the type of bag having flotation, and in the case of the type of bag which is fastened to the dock, a very substantial strain will be placed upon the fastening means resulting in either tearing of the bag or reduced buoyancy of the dock. Another serious disadvantage is that water currents cause the bottom portion of the bag to surge upwardly and become abraded against the sharp edges of the boat. Such abrasion results in tearing of the bag. The bag must then be removed from the water, repaired and replaced. Such an operation is time consuming and unpleasant. Tearing also takes place at the bunched-up rear portion of the prior art bags because of the excess material required by the opening and closing of the draw-string. Additionally, it is common for this bunched-up portion of the bag to catch on the rudder, keel, or propeller of the boat when the boat is moving into or out of the slip. This is a particular problem when the slip is exposed to any appreciable amount of current.

Examples of such prior art bags of this nature are disclosed in U.S. Pat. No. 3,142,283 issued July 28, 1964 and U.S. Pat. No. 3,205,851 issued Sept. 14, 1965.

SUMMARY OF THE INVENTION

The boat hull protecting apparatus of the present invention eliminates the above-enumerated disadvantages of the prior art devices. The boat hull protecting apparatus of the present invention includes a rigid framework having a gate pivotally connected to its rear portion. Such gate is movable between a raised, closed position wherein it defines the aft portion of the framework and a lowered, opened position. The framework is covered by a bag formed of a flexible sheet of waterproof material. The parts are so arranged that when the gate is moved to its lower, opened position a boat to be protected is provided ingress and egress from the confines of the bag. The framework can either be attached to the sides of the boat slip or alternatively to buoyant floatation means. The framework serves to completely isolate the boat from the bag, and accordingly, even though water currents will move the bag, such movement will not bring the bag into contact with the boat. The gate when disposed in its lower, opened position, retains the rear portion of the bag completely out of contact with the boat as the boat moves into and out of the confines of the bag.

The apparatus of the present invention permits the use of a bag which is of a lighter and hence less expensive material than with prior art devices of this type. Unique means are provided for attaching the bag to the framework so that the bag can be readily replaced without the use of tools, adhesives or mechanical fasteners. Accordingly, the bag can be readily replaced and at much less cost than replacing the bag portion of prior art boat hull protecting apparatus.

DESCRIPTION OF A PREFERRED EMBODIMENT

Figure 1:
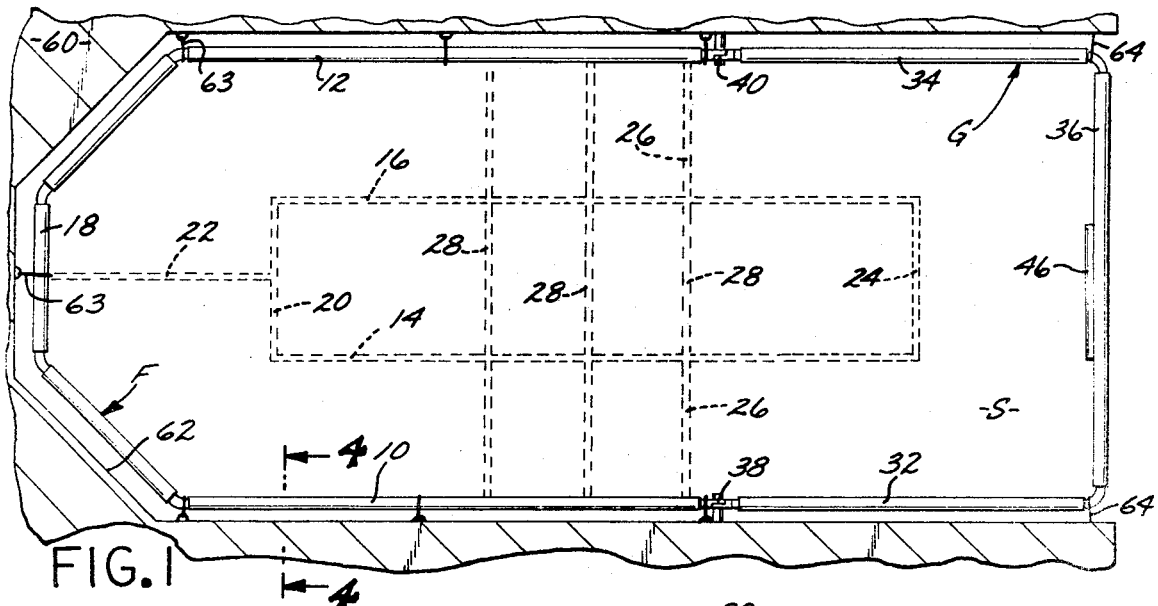
FIG. 1 is a top plan view showing a preferred form of boat hull protecting apparatus embodying the present invention.
Figure 2:
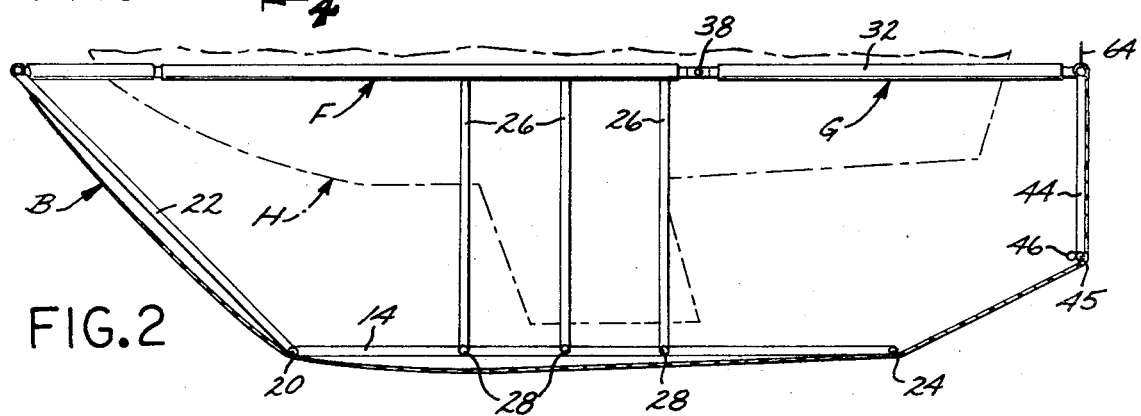
FIG. 2 is a side view of said apparatus with the gate disposed in its raised, closed position.
Figure 3:
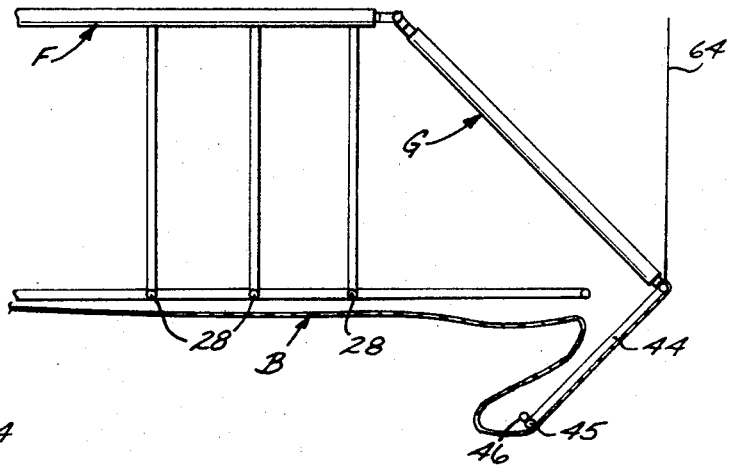
FIG. 3 is a fragmentary side view showing the rear portion of such apparatus, with the gate disposed in its lower, opened position.

Referring to the drawings, a preferred form of boat hull protecting apparatus embodying the present invention includes a rigid framework means, generally designated F, that defines a space S having greater dimensions than the hull of a boat to be protected. The outline of a boat hull H appears in FIG. 2, such hull H being disposed within the confines of the space 9. The rear portion of the framework means F includes a gate, generally designated G. The gate G is movable between its raised, closed position of FIGS. 1 and 2 and its lower, opened position of FIG. 3. A bag, generally designated B, fabricated from a flexible sheet of waterproof synthetic plastic material is secured over the framework means F and the gate G thereof.

More particularly, the framework F may be fabricated of rigid, synthetic plastic tubing, with the intersecting elements of such tubing being rigidly interconnected as by a suitable adhesive. Also, the tubing may be stiffened by means of a foamed-in-place synthetic plastic. The framework tubing includes a pair of upper side elements 10 and 12, and a pair of lower side elements 14 and 16. The front ends of the upper side elements 10 and 16 are interconnected by means of a bow piece 18, while the front ends of the lower side elements 14 and 16 are interconnected by a bow piece 20. An inclined stem piece 22, interconnects the midportion of the upper and lower bow pieces 18 and 20. The rear ends of the lower side pieces 14 and 16 are interconnected by a horizontal stern piece 24. The intermediate portion of the upper and lower side elements are interconnected by plurality of like side spacers 26. The lower side pieces 14 and 16 are interconnected at their intermediate portions with transverse pieces 28 that are aligned with the lower ends of the side spacers 26.

The gate G includes a pair of upper side elements 32 and 34 which are rigidly interconnected at their rear ends by a cross-piece 36. The front ends of the side pieces 32 and 34 are pivotly connected to the rear ends of the afore-mentioned side pieces 10 and 12 by like horizontal lag bolts 38 and 40 that serve as pivot pins. A pair of transom pieces 44 depend from the opposite sides of the cross-piece 36, however, only one of such elements 44 can be seen in the drawings. A bottom piece 45 rigidly extends between the lower ends of the transom piece 44. A weight 46, such as a sand tube or the like, is affixed to the front surface of the bottom piece 45.

The bag B is formed of a suitable thin synthetic plastic material. Preferably, such material will be light-transmitting so as to inhibit marine growth on the exterior thereof.

Figure 4:
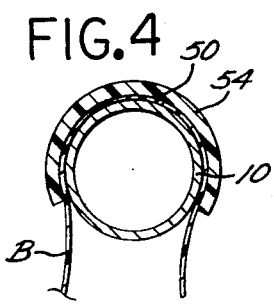
FIG. 4 is a vertical sectional view taken in enlarged scale along line 44 of FIG. 1.

The upper peripheral portion 50 of the bag B is removably affixed to the upper edges of the frame F, including the side pieces 10 and 12, bow piece 18, gate sides 32 and 34, and transom piece 36. Referring now to FIG. 4, the upper peripheral portion 50 of the bag B will preferably be removably secured to the upper tubing pieces of the frame by means of a plurality of split tubing elements 54. Thus, as indicated in FIG. 4, the upper peripheral portion 50 of the bag is wrapped around the tubing piece 10 and thereafter a split tubing element 54 is snapped about the tubing piece 10 with the bag portion 50 sandwiched between the outer surface of the tubing piece 10 and the inner surface of the split tubing element 54. The resiliency of split tubing element 54 should be so chosen as to frictionally retain the bag B in place. Should it become necessary to replace or repair the bag B, the split tubing elements 54 may be readily flexed upwardly off their respective tubing pieces. The old bag is then replaced and the tubing elements 54 then again snapped in place about their respective tubing pieces.

In the use of the aforedescribed apparatus, the upper portion of the framework F is secured to the dock 60 defining boat slip 62 by suitable means, such a plurality of lines 63. Additionally, the lag bolts 38 and 40 may be extended into the side members of the dock 60. The gate G is normally held in its raised, closed position of FIGS. 1 and 2 by means of suitable gate lines 64. These gate lines 64 extend between the transom piece 36 and cleats or the like (not shown) affixed to the dock 60. With the gate G in its raised closed position, the boat hull H is completely enveloped by the bag B and the ambient seawater is sealed from space S. Suitable antifouling chemicals are then added to the water within the space S in an amount sufficient to prevent marine growth on either the exterior of the boat hull or the interior of the bag B. When it is desired to remove the boat from the slip 62 the gate lines 64 are lowered whereby the weight 46 will cause the gate G to drop to its lower, opened position.

It should be particularly noted that the framework F prevents the bag B from contacting any part of the boat hull H. This is true even when the gate G is arranged in its lower, closed position. Accordingly, there is no possibility that the bag B can be abraded or torn by contact with the boat hull H. When the boat is returned to the confines of the slip 62, the gate lines 64 will be pulled so as to raise the gate G to its raised, closed position.

Various modifications and changes may be made with respect to the foregoing detailed description without departing from the spirit of the present invention. By way of example, the framework F may be provided with buoyant floatation means to support it slightly above the water surface in place of the lines 63 shown in the drawings.

I claim:

1. Apparatus to protect a boat hull against marine growth, said apparatus, comprising:

rigid, generally hull-shaped framework means defining a space having greater dimensions than the hull of a boat to be protected, said framework means including upper and lower side elements interconnected at their front ends by bow piece elements and a stem piece element connecting said bow piece elements, and with side spacer pieces connecting the intermediate portions of said upper and lower side elements;

a weighted gate pivotally connected to the rear of said framework means and movable between a raised, closed position wherein it defines the aft portion of said framework and a lowered, opened position; and a bag fabricated from a flexible sheet of waterproof material, said bag being secured to said framework means and the gate thereof, with the construction and arrangement of the parts being such that when said gate is moved to its lowered opened position, a boat to be protected is provided ingress and egress from the confines of said bag, and with the recited elements of said framework means and said gate at all times positively maintaining said bag spaced from said hull.

2. Apparatus as set forth in claim 1 wherein said bag is removably secured to said framework means.

3. Apparatus as set forth in claim 2 wherein said framework means includes tubing pieces and split tubing elements are removably snapped about said tubing pieces, with the upper peripheral portion of said bag being secured between said tubing pieces and said split tubing elements.

* * * * *